US009587926B2

(12) United States Patent
Hyslop

(10) Patent No.: US 9,587,926 B2
(45) Date of Patent: Mar. 7, 2017

(54) DEVICE FOR MEASURING AIRFOIL SPACING

(71) Applicant: Turbine Services Ltd., Saratoga Springs, NY (US)

(72) Inventor: Justin D. Hyslop, Waterford, NY (US)

(73) Assignee: Turbine Services Ltd., Saratoga Springs, NY (US)

( * ) Notice: Subject to any disclaimer, the term of this patent is extended or adjusted under 35 U.S.C. 154(b) by 120 days.

(21) Appl. No.: 14/627,873

(22) Filed: Feb. 20, 2015

(65) Prior Publication Data
US 2016/0245637 A1   Aug. 25, 2016

(51) Int. Cl.
  *G01B 5/14*   (2006.01)
  *G01D 13/02*   (2006.01)
  *G01B 3/26*   (2006.01)

(52) U.S. Cl.
  CPC ............ *G01B 5/14* (2013.01); *G01B 3/26* (2013.01); *G01D 13/02* (2013.01)

(58) Field of Classification Search
  CPC ... G01B 5/02; G01B 5/14; G01B 5/20; G01B 5/26; G01B 5/207
  USPC .......... 33/555, 557, 552, 810–813, 534, 794
  See application file for complete search history.

(56) References Cited

U.S. PATENT DOCUMENTS

| | | | |
|---|---|---|---|
| 2,030,354 A | 2/1936 | Czemba | |
| 2,924,017 A | 2/1960 | Sorensen | |
| 3,464,119 A * | 9/1969 | Griggs | B07C 5/04 33/552 |
| 3,757,424 A * | 9/1973 | Palmenberg | G01B 5/205 33/534 |
| 3,778,906 A * | 12/1973 | Palmenberg | G01B 5/20 33/555 |
| 4,222,172 A * | 9/1980 | Mason | G01B 5/26 33/548 |
| 4,322,887 A * | 4/1982 | Burton | G01B 5/14 33/552 |
| 4,374,459 A * | 2/1983 | Burton | G01B 5/207 33/548 |
| 4,953,412 A | 9/1990 | Rosenberg et al. | |
| 8,127,581 B2 * | 3/2012 | Davis | B23P 6/002 269/291 |
| 8,826,557 B2 * | 9/2014 | Yang | G01B 3/20 33/609 |
| 2009/0064520 A1 * | 3/2009 | Sherlock | F01D 25/285 33/562 |

FOREIGN PATENT DOCUMENTS

GB           1058398 A       2/1967

OTHER PUBLICATIONS

International Search Report dated Jun. 9, 2016.

* cited by examiner

*Primary Examiner* — Yaritza Guadalupe-McCall
(74) *Attorney, Agent, or Firm* — Wood, Phillips, Katz, Clark & Mortimer

(57) ABSTRACT

A device and method for measuring the spacing between adjacent airfoils. A notched member engages a trailing edge of one of the adjacent airfoils with the notched member being rotatable about the one airfoil trailing edge. A wheel is rollable across the surface of the other airfoils while moving in a first direction toward and away from the notched member, and biased away from the notched member. A gauge secured to the notched member measures the distance of the guide from the notched member in the first direction.

13 Claims, 1 Drawing Sheet

DEVICE FOR MEASURING AIRFOIL SPACING

CROSS-REFERENCE TO RELATED APPLICATIONS

Not Applicable.

FIELD OF THE INVENTION

The present application relates to measuring devices and more particularly devices for measuring spacing between airfoils.

BACKGROUND OF THE INVENTION

Gas turbines typically include components which operate at high speeds and are subjected to high mechanical loads at elevated temperatures. Proper and efficient operation of such turbines require precision in placement and relative orientation of the components, particularly the turbine airfoils.

Typically, in the industrial gas turbine (IGT) industry, this requires checking the measurement of the minimum distance ("throat") between two adjacent airfoils to ensure that proper airfoil positions are maintained. Such measurements are typically made at three radial positions, perpendicular to the trailing edge of an airfoil, with each turbine typically having a large number of such spaced airfoils.

Heretofore, such measurements have typically been taken by first wedging either adjustable parallels or telescoping gauges into the expected throat position, and then maintaining those parallels/gauges in that position for subsequent measurement with Vernier calipers or micrometers.

This technique can be time consuming, requiring not only positioning the parallels/gauges properly, but then separately measuring the parallels/gauges, with the results of such technique often being user dependent. Further, if the position of the parallels/gauges is not adequately maintained prior to measurement (by, e.g., a micrometer), added time can be required to reposition the parallels/gauges for each such measurement. Of course, if it is not noticed that the position is not properly maintained prior to measuring, this can also yield incorrect measurements. In fact, dimensional repeatability errors of 15-25% of the applicable tolerance have been found to occur even between skilled operators, The present invention is directed toward improving upon the efficiency and reliability of measuring between turbine airfoils.

SUMMARY OF THE INVENTION

In one aspect of the present invention, a device for measuring the spacing between adjacent airfoils is provided, including a notched member adapted to engage a trailing edge of one of the adjacent airfoils with the notched member being rotatable about the one airfoil trailing edge. A guide is movable across the surface of the other of the adjacent airfoils, the guide being secured for movement in a first direction toward and away from the notched member, the guide being biased away from the notched member. A gauge secured to the notched member measures the distance of the guide from the notched member in the first direction.

In one form of this aspect of the invention, the guide is a wheel rotatable about an axis substantially parallel to the axis of rotation of the notched member about the one airfoil trailing edge, and the wheel rolls on the other airfoil when the notched member is rotated about the one airfoil.

In another form of this aspect of the invention, the gauge includes a resettable indicator of the minimum spacing of the guide relative to the notch since the indicator was last reset.

In still another form of this aspect of the present invention, the spacing between adjacent airfoils is measured by (a) positioning the measuring device with the trailing edge of the one adjacent airfoil in the notch member, (b) rotating the measuring device around the one airfoil trailing edge while maintaining the trailing edge in contact with the notch member, (c) maintaining the guide in contact with the other of the adjacent airfoils during the rotating step, and (d) determining from the measuring device gauge the minimum distance between the notch member and the guide during the rotating step.

In another aspect of the present invention, a device for measuring the spacing between adjacent airfoils is provided, including a device frame having a longitudinal direction and a lateral direction, with a notched member on the frame adapted to engage a trailing edge of one of the adjacent airfoils, the notched member being rotatable about the one airfoil trailing edge. A wheel is secured to the frame for movement in the longitudinal direction, the wheel being aligned in the longitudinal direction with the notched member and biased away from the notched member. A gauge is secured to the frame and measures the position of the wheel relative to the notched member in the longitudinal direction.

In one form of this aspect of the present invention, the gauge includes a resettable indicator of the minimum spacing of the wheel relative to the notch since the indicator was last reset.

In another form of this aspect of the present invention, the wheel is rotatable about an axis substantially parallel to the axis of rotation of the notched member about the one airfoil trailing edge, and the wheel rolls on the other airfoil when the notched member is rotated about the one airfoil.

In still another form of this aspect of the present invention, the spacing between adjacent airfoils is measured by (a) positioning the measuring device with the trailing edge of the one adjacent airfoil in the notch member, (b) rotating the device frame around the one airfoil trailing edge while maintaining the trailing edge in contact with the notch member, (c) maintaining the wheel in contact with the other of the adjacent airfoils during the rotating step, and (d) determining from the measuring device gauge the minimum distance between the notch member and the wheel during the rotating step.

In still another aspect of the present invention, a device for measuring the spacing between adjacent airfoils is provided, including a device frame having a longitudinal direction and a lateral direction and including a base having substantially flat first and second surfaces lying in first and second planes, respectively, with the frame being rotatable about a trailing edge of one of the adjacent airfoils with both the first and second surfaces engaging the one airfoil. A wheel is secured to the frame for movement in the longitudinal direction, with the wheel being aligned in the longitudinal direction with the frame base and biased away from the frame base. A gauge is secured to the frame, with the gauge measuring the position of the wheel relative to the frame base in the longitudinal direction.

In one form of this aspect of the invention, the wheel rotates about an axis, and the first and second planes intersect along a line substantially parallel to the axis.

In another form of this aspect of the invention, the base first surface extends in the lateral direction and the base second surface extends in the longitudinal direction, and the guide measures the distance in the longitudinal direction of the wheel from the base first surface.

In yet another form of this aspect of the invention, the gauge includes a resettable indicator of the minimum spacing of the wheel relative to the notch since the indicator was last reset.

In still another form of this aspect of the present invention, the spacing between adjacent airfoils is measured by (a) positioning the measuring device with the trailing edge of the one adjacent airfoil engaging the base first and second surfaces, (b) rotating the measuring device around the one airfoil trailing edge while maintaining the trailing edge in contact with the base first and second surfaces, (c) maintaining the wheel in contact with the other of the adjacent airfoils during the rotating step, and (d) determining from the measuring device gauge the minimum distance between the base and the wheel during the rotating step.

Other objects, features, and advantages of the invention will become apparent from a review of the entire specification, including the appended claims and drawings.

DETAILED DESCRIPTION

Figure 1:
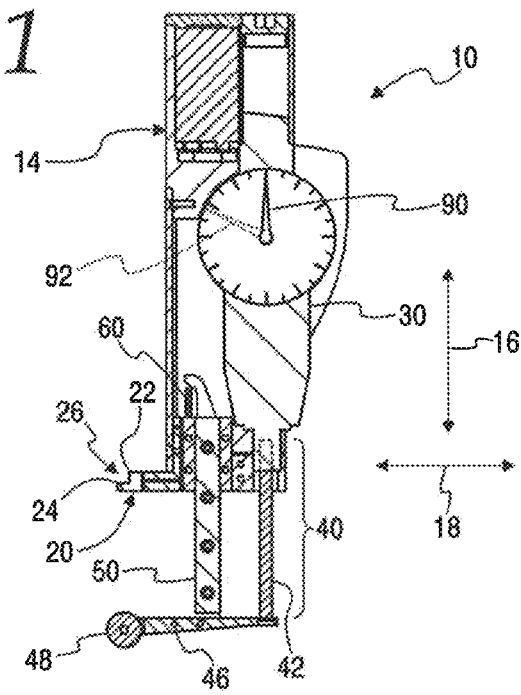
FIG. 1 is a side cross-sectional view of one embodiment of the measuring device of the present invention.

The measuring device 10 of the present invention is illustrated in FIG. 1. The measuring device 10 includes a frame 14 with a longitudinal direction 16 and lateral direction 18.

A notched upper arm or base 20 is secured on one side of the frame 14 and includes a longitudinally extending flat surface 22 perpendicular to a laterally extending flat surface 24, with the two surfaces 22, 24 together defining the notch 26. The flat base surfaces 22, 24 lie in planes which intersect along a line perpendicular to both the longitudinal and lateral directions. The width of the flat surfaces 22, 24 (in the direction of the line of intersection) is sufficient to allow the device 10 to be rotated reliably about an airfoil trailing edge as described below without the device 10 wobbling out of the plane of the longitudinal and lateral directions.

A gauge 30 which measures the spacing of airfoils (as further described hereinafter) is also secured to the frame 14.

A carriage or guide structure 40 is secured to the frame 14 so as to be longitudinally movable relative to the notched base 20. In the illustrated embodiment, the guide structure 40 includes a longitudinally extending rail or guide rod 42 having a laterally extending guide arm 46 secured to its bottom. The guide rod 42 is reciprocal in the longitudinal direction relative to the frame 14, with the gauge 30 measuring the longitudinal position of the guide rod 42.

The laterally extending guide arm 46 on the end opposite the guide rod 42 supports a rotatable wheel 48 which is aligned longitudinally with the notch 26 of the base 20. The axis of rotation of the wheel 48 is substantially parallel to that line of intersection of the planes of the base surfaces 22, 24. Suitable friction reducing bearings may be provided to facilitate free rotation of the wheel 48 about its axis.

A biasing leg 50 is parallel to the guide rod 42 and is also suitably secured to the frame 14 so as to be movable linearly in a longitudinal direction relative to the notched base 20. A suitable biasing mechanism, such as a tension spring 60, is secured to the proximate (top) end of the leg 50 so as to continuously bias the leg 50 down, with the distal (bottom) end of the leg 50 adapted to push the guide arm 46 down (away from or toward out of the frame 14). A suitable stop structure is provided to limit such longitudinal movement to a maximum extension from the frame 14 such as illustrated in FIG. 1.

Figure 2:
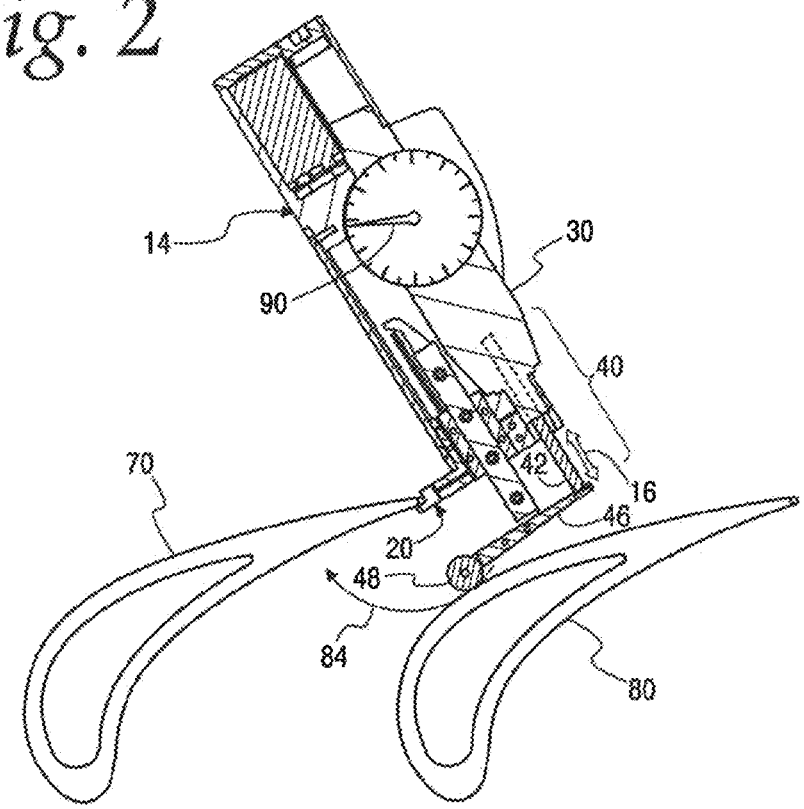
FIG. 2 is a view of the measuring device in use measuring the spacing between two air foils.

Use of the measuring device 10 to measure the spacing between two airfoils 70, 80 is illustrated in FIG. 2.

The upper arm or base 20 is positioned to cradle or nest with the trailing edge of one of the airfoils 70 so that both base surfaces 22, 24 contact the trailing edge. The measuring device 10 is then rotated or swept through an arc 84 about the airfoil trailing edge by maintaining the base surfaces 22, 24 in contact with the airfoil trailing edge during such rotation. The biasing of the carriage 40 (by, e.g., the tension spring 60) maintains the wheel 48 in contact and rolling across the surface of the other airfoil 80 during such device rotation about the airfoil trailing edge. At some point during that rotation, the carriage 40 will extend a minimum amount (e.g., at the position shown in FIG. 2), such that rotation from that position will cause the carriage 40 to be biased further out from the frame 14.

It should be appreciated that measurements may be derived from the device 10 in a variety of manners, where the airfoil spacing measurement is the spacing between the base lateral surface 24 and the wheel 48. (As used herein, spacing from the wheel 48 refers to spacing from the point on the outer surface of the wheel 48 which is furthest from the base lateral surface 24, i.e., at the bottom perimeter of the wheel 48 tangential to the lateral direction).

For example, the gauge 30 may be of the dial type with a dial indicator 90, with the dial calibrated so that the position of its dial indicator 90 (or other suitable data indicator) reflects in a suitable manner the spacing at any given time of the base lateral surface and the wheel 48. Thus, the position of the dial indicator 90 in FIG. 1 would indicate that the surface 24/wheel 48 spacing is the known maximum with the carriage 40 extended fully. When the device 10 is used as described, the dial indicator 90 will move as the carriage moves, such that the position of the dial 90' as shown in FIG. 2 indicates a lesser, known calibrated spacing.

It should be appreciated that the dial may be read by the device user as it is swept through the arc 84, whereby the person will mentally determine when the minimum spacing is indicated by the dial indicator 90. A secondary, resectable dial indicator 92 may also be used, which dial indicator 92 is will travel with the primary dial 90 only in the direction indicative of decreasing spacing. With such a dial, the device 10 may be quickly swept through the arc 84 and then the position of the dial indicator 92 read afterwards to determine the minimum spacing.

Still other gauges may be used while obtaining advantages of the present invention. For example, digital gauges could be used, with digital readouts indicative of spacing and/or transmitters suitable for transmitting the data to a suitable computer for use thereafter.

It should be appreciated that measuring indicators 10 according to the present invention may be used to quickly and reliable obtain the minimum spacing between adjacent airfoils at numerous points. Moreover, such measurements will be accurate and consistent between different users.

The invention claimed is:

1. A device for measuring the spacing between adjacent airfoils, comprising:
 a notched member adapted to engage a trailing edge of one of said adjacent airfoils, said notched member being rotatable about said one airfoil trailing edge;

a guide adapted to follow the surface of the other of said adjacent airfoils, said guide being secured for movement in a first linear direction toward and away from said notched member, said guide being biased away from said notched member; and a gauge secured to said notched member and measuring the distance of said guide from said notched member in said first direction.

2. The measuring device of claim 1, wherein said gauge includes a resettable indicator of the minimum spacing of said guide relative to said notch since said indicator was last reset.

3. A device for measuring the spacing between adjacent airfoils, comprising:
a notched member adapted to engage a trailing edge of one of said adjacent airfoils, said notched member being rotatable about said one airfoil trailing edge;
a guide movable across the surface of the other of said adjacent airfoils, said guide being secured for movement in a first direction toward and away from said notched member, said guide being biased away from said notched member; and
a gauge secured to said notched member and measuring the distance of said guide from said notched member in said first direction;
wherein:
said guide is a wheel rotatable about an axis substantially parallel to the axis of rotation of said notched member about said one airfoil trailing edge, and
said wheel rolls on the other airfoil when said notched member is rotated about said one airfoil.

4. A method of measuring the spacing between adjacent airfoils, comprising the steps of:
providing a measuring device for measuring the spacing between adjacent airfoils, said device having
a notched member adapted to engage a trailing edge of one of said adjacent airfoils, said notched member being rotatable about said one airfoil trailing edge,
a guide movable across the surface of the other of said adjacent airfoils, said guide being secured for movement in a first direction toward and away from said notched member, said guide being biased away from said notched member, and
a gauge secured to said notched member and measuring the distance of said guide from said notched member in said first direction;
positioning the measuring device with the trailing edge of said one adjacent airfoil in said notch member;
rotating said measuring device around said one airfoil trailing edge while maintaining said trailing edge in contact with said notch member;
maintaining said guide in contact with the other of said adjacent airfoils during said rotating step; and
determining from the measuring device gauge the minimum distance between the notch member and the guide during the rotating step.

5. A device for measuring the spacing between adjacent airfoils, comprising:
a device frame having a longitudinal direction and a lateral direction;
a notched member on said frame adapted to engage a trailing edge of one of said adjacent airfoils, said notched member being rotatable about said one airfoil trailing edge;
a wheel secured to said frame for movement in said longitudinal direction, said wheel being aligned in said longitudinal direction with said notched member and biased away from said notched member; and
a gauge secured to said frame, said gauge measuring the position of said wheel relative to said notched member in said longitudinal direction.

6. The measuring device of claim 5, wherein said gauge includes a resettable indicator of the minimum spacing of said wheel relative to said notch since said indicator was last reset.

7. The measuring device of claim 5, wherein:
said wheel is rotatable about an axis substantially parallel to the axis of rotation of said notched member about said one airfoil trailing edge, and
said wheel rolls on the other airfoil when said notched member is rotated about said one airfoil.

8. A method of measuring the spacing between adjacent airfoils, comprising the steps of:
positioning the measuring device of claim 5 with the trailing edge of said one adjacent airfoil in said notch member;
rotating said device frame around said one airfoil trailing edge while maintaining said trailing edge in contact with said notch member;
maintaining said wheel in contact with the other of said adjacent airfoils during said rotating step; and
determining from the measuring device gauge the minimum distance between the notch member and the wheel during the rotating step.

9. A device for measuring the spacing between adjacent airfoils, comprising:
a device frame having a longitudinal direction and a lateral direction and including a base having substantially flat first and second surfaces lying in first and second planes, respectively, said frame being rotatable about a trailing edge of one of said adjacent airfoils with both said first and second surfaces engaging said one airfoil;
a wheel secured to said frame for movement in said longitudinal direction, said wheel being aligned in said longitudinal direction with said frame base and biased away from said frame base; and
a gauge secured to said frame, said gauge measuring the position of said wheel relative to said frame base in said longitudinal direction.

10. The measuring device of claim 9, wherein said wheel rotates about an axis, and said first and second planes intersect along a line substantially parallel to said axis.

11. The measuring device of claim 9, wherein said base first surface extends in said lateral direction and said base second surface extends in said longitudinal direction, and said guide measures the distance in the longitudinal direction of the wheel from the base first surface.

12. The measuring device of claim 9, wherein said gauge includes a resettable indicator of the minimum spacing of said wheel relative to said notch since said indicator was last reset.

13. A method of measuring the spacing between adjacent airfoils, comprising the steps of:
positioning the measuring device of claim 9 with the trailing edge of said one adjacent airfoil engaging said base first and second surfaces;
rotating said measuring device around said one airfoil trailing edge while maintaining said trailing edge in contact with said base first and second surfaces;
maintaining said wheel in contact with the other of said adjacent airfoils during said rotating step;

determining from the measuring device gauge the minimum distance between the base and the wheel during the rotating step.

* * * * *